United States Patent Office 2,805,039
Patented Sept. 3, 1957

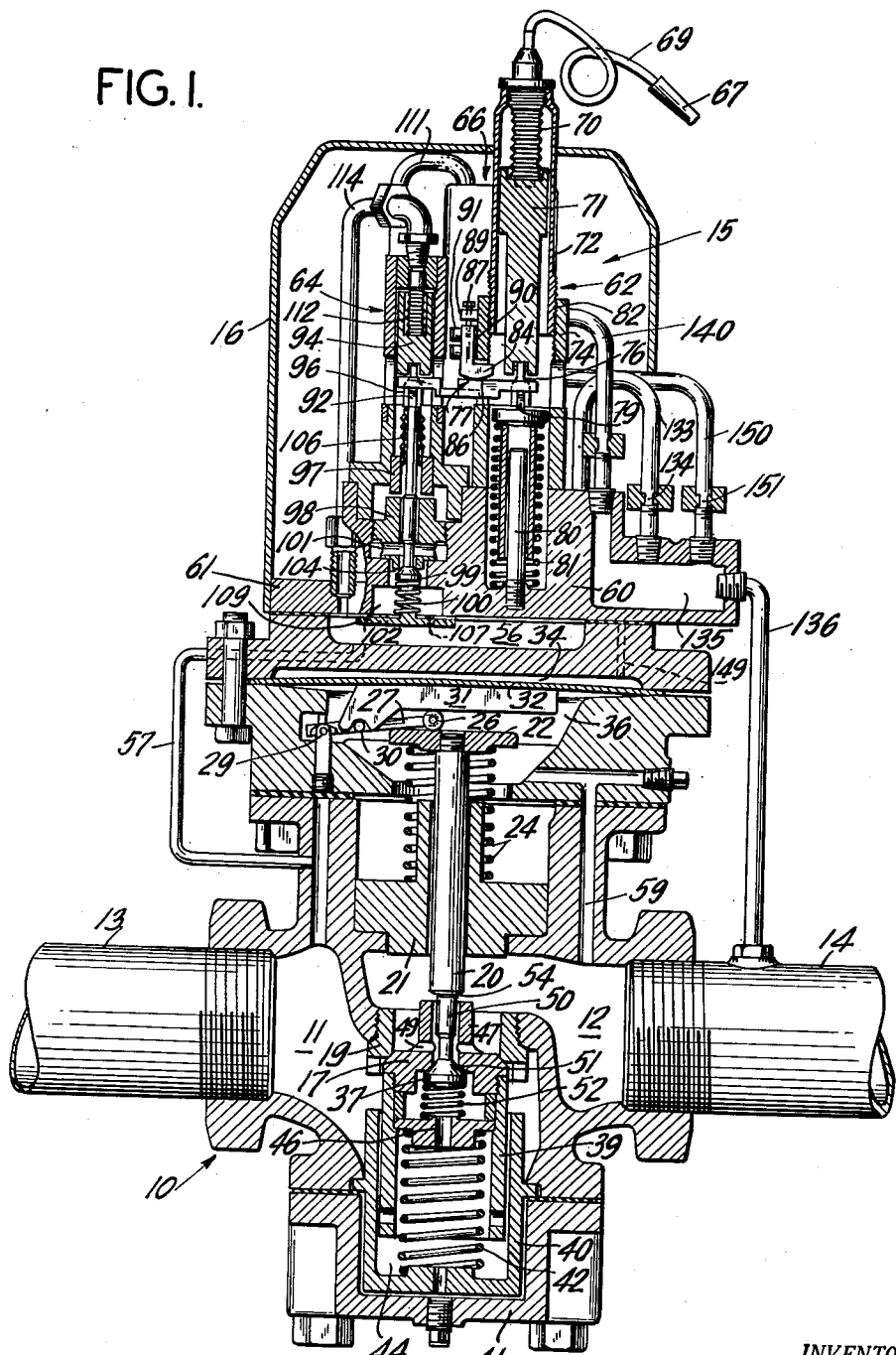
FIG. I.
INVENTOR.
HENRY W. ANGELERY

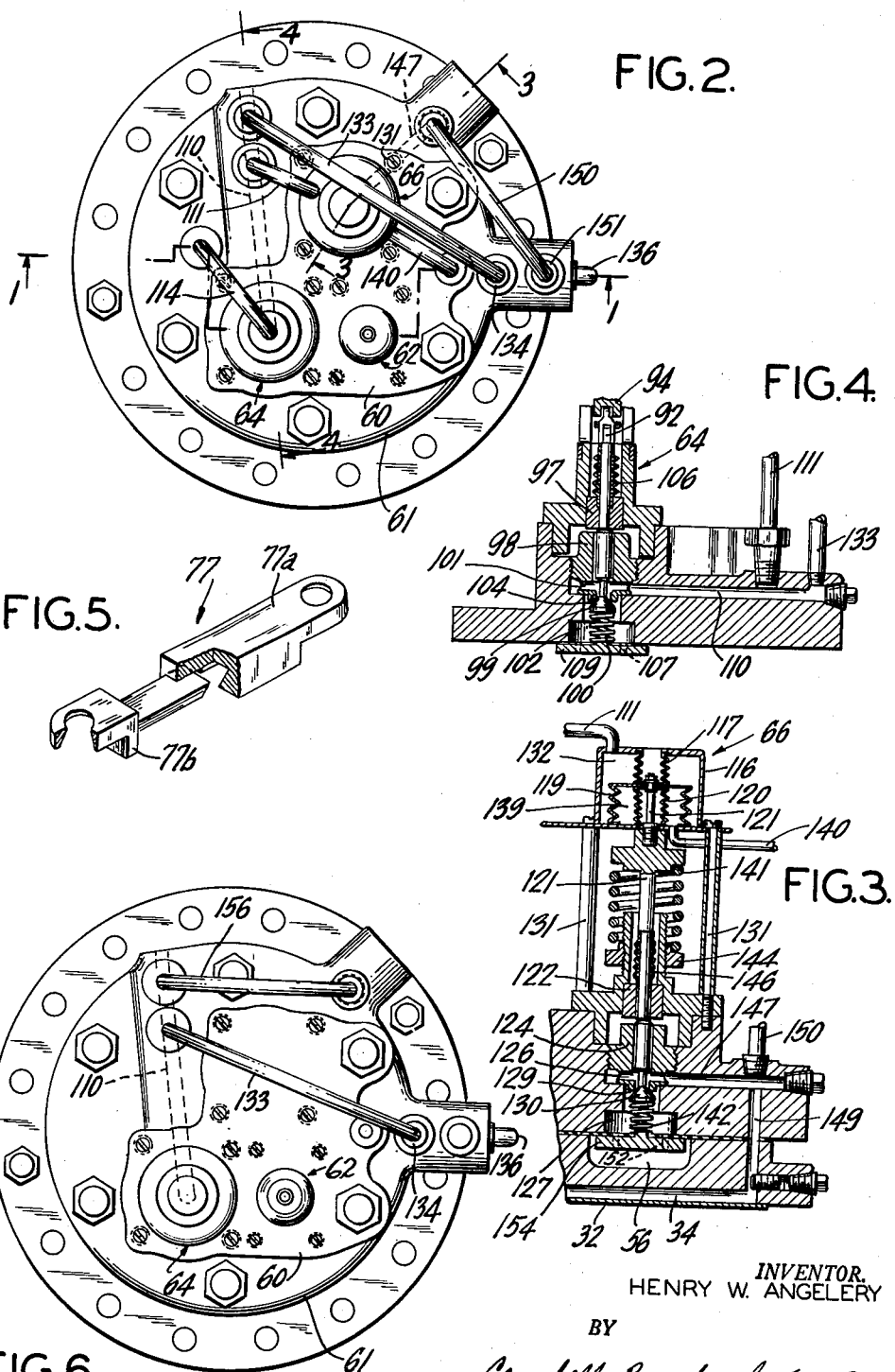

2,805,039

STATICALLY AND DYNAMICALLY BALANCED PRESSURE ACTUATED VALVE

Henry W. Angelery, Englewood, N. J.

Application May 28, 1953, Serial No. 357,982

3 Claims. (Cl. 251—38)

The present invention relates to a self-contained mechanism for regulating automatically the rate of transfer of of heat between two fluids in order to maintain one of the fluids at a preselected temperature.

The term "subject fluid" as used herein is applied to the fluid whose final temperature and, if desired, state is to be controlled. The term "regnant fluid" as used herein is applied to the fluid used to control the temperature or state, or both, of the subject fluid. The flow of heat may be from the regnant fluid to the subject fluid or vice versa. Thus, for example, in a steam-water heat exchanger for maintaining the water at a preselected temperature, the steam is the regnant fluid and the water is the subject fluid. In a refrigeration system, on the other hand, the refrigerating medium is the regnant fluid and the subject may be air or some other fluid.

It is well known that the rate of heat transfer between two fluids is a function of their temperature differential and the effective heating surface, i. e., the heat transfer area, in the heat exchanger. Therefore, to maintain the subject fluid at a constant temperature with variations in heat demand, such as those due to changes in rate of flow or incoming temperature of the subject fluid, the rate of heat transfer must be held in balance with the changing heat demands. If the heat transfer surface is assumed to remain constant, it becomes necessary to vary the temperature of the regnant fluid as the heat demand changes, the variations in temperature of the regnant fluid being directly proportional to the changes in heat demand in order to maintain a balance between heat demanded and heat supplied.

The temperature of fluids in the vapor state, e. g., saturated steam, is dependent on the pressure. The relation of temperature to pressure is, however, by no means constant. Thus, for example, reference to the steam tables will show that for saturated steam, with a 5 lb. pressure difference from 15 to 20 p. s. i. a. (lbs. per square inch absolute), the temperature difference is 14.93° F., from 65 to 70 p. s. i. a. it is 4.95° F., and from 115 to 120 p. s. i. a. it is only 3.18° F. Hence, the temperature and pressure relation of saturated steam is a geometric or exponential function in which the exponent is a value other than one, as distinguished from a relation that is constant and can be termed a linear (or arithmetic) function; i. e., an exponential function, the exponent of which is one.

It is apparent, therefore, that changing the pressure of the regnant fluid as a direct or linear function of changes in heat demand will not effect the proper balance in the heat transfer rate and will not maintain the subject fluid at a constant temperature because of the aforementioned varying relation between temperature and pressure in the regnant fluid. Also, a varying heat demand cannot be balanced properly by varying the volume or quantity of flow of the regnant fluid without control of its temperature or pressure; hence, the sensible temperature of the subject fluid, e. g., the outlet temperature of water in a steam-water heat exchanger, will not be held constant under such conditions.

In control mechanisms known to have been proposed heretofore for regulating the flow of steam in response to a temperatuure sensitive device in the water or other fluid to be heated by the steam, proper consideration has not been given to controlling this variable relation between the pressure and temperature of steam at low and high pressures and its effect on the heat transfer rate. Thus, for example, proposals have been made to provide a thermostat-controlled steam valve which would open whenever the sensible or actual temperature of the water to be heated by the steam falls 2° below the preselected or desired water temperature and closes as soon as the sensible temperature of the water reaches the preselected temperature. This does not take into consideration whether or not the rate of steam flow into the heat exchanger will be in balance with the rate of heat transfer required for the load or demand for heat. The degree to which the steam valve is opened in mechanisms of this type and, therefore, the pressure of the steam on the discharge side of the valve in the heat exchanger, varies directly with the difference between the preselected and the sensible temperatures of the water in the heat exchanger. This does not provide the correlation between the discharge pressure or temperature of the steam and the temperature changes in the water that is necessary to maintain the required balance between heat transfer rate and heat demand in the heater. It simply changes the volume or rate of flow of steam directly with changes in the temperature of the water. Because of this inability of heretofore proposed mechanisms to maintain a proper balance between heat transfer rate and heat demand, such mechanisms tend to "hunt," i. e., go through a cycle of operations wherein the sensible water temperature alternately goes higher and lower than desired.

When the fixed or arithmetic ratio of pressure change in steam to temperature change in water is small in regulating mechanisms which vary the pressure of the steam on the discharge side of the valve and in the heat exchanger directly with the difference between the preselected and the sensible temperature of the water in a heat exchanger, the variations in the sensible temperature of the water must be large in order to signal a large demand for heat, with the result that the response of the mechanism to a large demand for heat is sluggish. Conversely, if the aforementioned fixed or arithmetic ratio is large, such mechanisms "hunt" when small demands for heat are sensed by relatively small changes in the sensible temperature of the water.

In order properly to regulate the temperature of the subject fluid, the temperature regulator must be capable of properly controlling the heat input in direct proportion to the changes in required heat transfer rate for the change in heat demand as measured, for example, by the rate of flow and incoming temperature of the subject fluid. Since the heat transfer rate varies in direct proportion to changes in the temperature differential between the subject and regnant fluids, assuming effective heating surface remains constant, and the relation between the temperature and the pressure of the regnant fluid is variable, i. e., a geometric rather than an arithmetic ratio, it is necessary to control the discharge pressure of the regnant fluid in a varying ratio to the changes in sensible temperature of the subject fluid in order to maintain the heat transfer rate in balance with load changes (required heat input) of the subject fluid. Thus, the ratio is required to be relatively small when the sensible temperature of the subject fluid approaches the preselected temperature and is required to become progressively greater as the difference between the sensible and the preselected temperatures of the subject fluid increases.

A contributing factor in the inability of control mechanisms heretofore proposed to balance adequately the heat demand and the heat transfer rate is that great instability, often referred to as valve flutter, is encountered at some position or positions of the valve head in known pressure actuated main valves. This instability is due to variations in pressure differentials within the valve that are caused by the flow of fluid therethrough.

It is necessary for proper control of any function, whether it be that of temperature, pressure or any other function, that a pressure actuated main valve be instantly responsive, but with stability, to every impulse sensed and transmitted by its control mechanism. Also, it must be capable of closing tight under no flow conditions and of opening to maximum aperture required for maximum flow of regnant fluid without affecting its stability due to variations in pressure differential across the valve head or disk of the valve caused by variations in flow rate of the regnant fluid when modulating to any position.

The control mechanism of the present invention is unique in being responsive not only to any departure from the preselected temperature of the subject fluid and to the degree of departure therefrom, but is also capable of compensating for the variable relationship between the pressure and temperature of the regnant fluid in that it not only actuates a flow of the regnant fluid in relatively greater volume when the temperature differential is great and throttles said flow to a relatively smaller volumetric rate when the temperature differential becomes small, but also maintains the proper temperature and pressure relation of the regnant fluid to sensible temperature of the subject fluid to maintain the heat transfer rate and the required demand for heat in proper balance. Also, the compensation for the variable relationship between the pressure and temperature of the regnant fluid is adjustable to maintain the proper heat balance for fluids other than water and steam.

In the preferred embodiment of my invention, the control mechanism comprises a pressure actuated main valve, the actuating pressure of which is controlled by a "differential" pressure pilot which is operated primarily by a temperature actuated pilot response in variable degree to the temperature of the subject fluid. Means are provided for modifying the operation of the differential pressure pilot by the pressure of the regnant fluid on the discharge side of the main valve. When the difference between the pressure at which the regnant fluid is available and the pressure of regnant fluid required to maintain the subject fluid at a preselected temperature is relatively small, the differential pressure pilot may be dispensed with and the main valve can be controlled directly by the temperature actuated pilot alone.

For optimum control of heat transfer between a regnant fluid and a subject fluid, I prefer to employ, in combination and close cooperation with the control mechanism of my invention, a novel pressure actuated main valve that is statically and dynamically balanced under all conditions of flow as a result of improvements not found in pressure operated main valves heretofore proposed. These improvements which enhance significantly the sensitivity and stability of the main valve and cooperate with the control mechanism to maintain the desired balance between heat demand and heat transfer rate, comprise a structure for reducing the force required initially to open the valve, stabilizing the pressure differential between the high and low pressure sides thereof when the valve is partly or completely open, and magnifying the displacement of the valve stem by the pressure diaphragm, thus reducing the displacement of the diaphragm and increasing its sensitivity to changes in pressure transmitted to it by the control mechanism.

The advantages and utility of the mechanism of this invention will become apparent from the following detailed description made with reference to the accompanying drawing, wherein:

Figure 1 is a sectional view in elevation of a preferred embodiment of the control mechanism and main valve of the invention taken on section line 1—1 of Figure 2;

Figure 2 is a plan view, with the cover removed, of control mechanism shown in Figure 1;

Figure 3 is a sectional view in elevation, taken along section line 3—3 of Figure 2, of a portion of the control mechanism;

Figure 4 is a sectional view in elevation, taken along section line 4—4 of Figure 2;

Figure 5 is an isometric view, partly cut away, showing a preferred construction of a lever forming an essential element in the control mechanism; and Figure 6 is a plan view, similar to Figure 2, showing a modified form of the control mechanism.

Referring now to Figure 1 of the drawing, 10 represents a main valve having an inlet chamber 11 and a discharge chamber 12 connected to high pressure line 13 and low pressure line 14, respectively. The control mechanism for the main valve is indicated generally at 15 as being covered by a cover 16.

The main valve 10 is provided with a primary valve head 17, a primary valve seat 19, and a valve stem 20 riding in a stem guide bushing 21 and having a disk 22 biased by a spring 24 against a roller 26 on a lever 27. The lever 27 has a fulcrum at 29 and a pin 30 bearing against a diaphragm pressure plate 31 which in turn bears against a flexible diaphragm 32 between upper and lower diaphragm chambers 34 and 36.

The valve head 17 has an interior, secondary valve seat 37 and a skirt 39 which is movable, as a unit with valve head 17, in a cylinder 40 held in position by main valve cap 41 and urged upward by a main spring 42 in a chamber 44 through the medium of a hollow boss 46. The upper portion or extension 47 of the valve head 17 is provided with vent ports 49 and accommodates a stem section 50 of reduced diameter carrying an interior, secondary valve head 51 urged upward against the interior valve seat 37 by a spring 52 seated on the boss 46, downward movement of the stem 20 relative to the valve head 17 being limited by abutment of a shoulder 54 against the upper portion 47 of the valve head. The inlet chamber 11 of the main valve is connected to a high pressure chamber 56 by means of a line 57 and the discharge chamber 12 communicates with the lower diaphragm chamber 36 by way of line 59.

The control mechanism 15 is mounted on the main valve 10 and generally includes a base 60, the lower portion 61 of which is secured to the main valve casing; a temperature actuated pilot 62, 64, shown best in Figure 1; and a differential pressure pilot 66, shown best in Figure 3.

The portion 62 of the temperature actuated pilot consists essentially of a thermostat bulb 67 installed at any desired location for sensing the actual or sensible temperature of the subject fluid (not shown). It is connected by means of a capillary tube 69 to a bellows 70 which, in turn, is secured to a plunger 71 movable vertically in the upper portion 72 of a telescoping housing 72, 74. The lower portion of the plunger 71 is in contact with a connecting piece 76 pivotally engaged with one arm 77a of a lower lever 77, the lower part of said connecting piece being engaged by a stem 79 guided for vertical movement on a stud 80 and biased upwardly by a spring 81. The bulb 67, tube 69 and bellows 70 form a closed chamber containing a fluid, preferably a liquid, which expands with an increase in temperature sensed by the bulb 67 and contracts with a decrease in said temperature. The housing components 72, 74 are threaded at 82 for adjusting the pressure exerted against the bellows 70 by the springs 81 acting through the stem 79, the connecting piece 76 and the plunger 71.

A shoe member 84 having a bearing surface 86 is attached to the housing member 74 for vertical adjustment, as by manipulation of a bolt 87 in a fixed support 89, and for horizontal adjustment by selection of a spacer 90 of desired thickness and tightening of a stud 91. The bearing surface 86 of the shoe member 84 may be of any desired shape that will insure movement of the point of contact of the bearing surface with the lever 77, and therefore a translation, upon actuation of the lever, of the effective fulcrum along the length thereof. As shown in Figure 1, for example, the bearing surface 86 may be convex so that upon clockwise rotation of the lever 77 the point of contact, i. e., the effective fulcrum, will move to the left.

The lever 77, as shown best in Figure 5, comprises two telescoping members or arms 77a and 77b so that the horizontal distance between the connected extremities thereof will remain constant upon tilting of the lever. The arm 77b, i. e., the left end of the lever as seen in Figure 1, is connected to a stem 92 and a plunger 94 in portion 64 of the temperature actuated pilot by means of a connecting piece 96 similar in construction to connecting piece 76 and likewise pivotally engaged with lever 77. The stem 92, which may, if desired, be made of three separate but coacting parts, is movable vertically in stem guides 97 and 98, carries a valve head 99 at its lower end and is spring biased by spring 100 to resist downward movement.

The base 60 under the portion 64 of the temperature actuated pilot contains a first metering valve having an upper chamber 101 and a lower chamber 102 separated by a valve seat 104 for the valve head 99, leakage of pressure along the stem 92 being effectively sealed by a bellows 106. The lower chamber 102 of the metering valve is connected to the high pressure chamber 56, and therefore by way of line 57 to the inlet chamber 11 of the main valve 10, by means of ports 107 in a boss 109 for the spring 100. The upper chamber 101 is connected, as shown best in Figures 2, 3 and 4, to the differential pressure pilot 66 by way of conduit 110 and line 111. A pressure equalizing assembly for the metering valve 99 consists of bellows 112 secured to the plunger 94 and connected to the high pressure chamber 56 by way of line 114.

The differential pressure pilot 66, shown best in Figure 3, in essence comprises a housing 116 containing bellows 117, 119 and 120 and the upper portion of a valve stem 121 movable vertically in stem guides 122 and 124, and a second metering valve having an upper chamber 126, a lower chamber 127, and a valve seat 129 for a valve head 130 carried on the lower end of stem 121. The stem 121 may, like stem 92, be made of three separate parts if desired. The housing 116 is secured in position above the base 60 by a number of tie rods 131. A first chamber 132 formed by the housing 116 and bellows 117 and 119 is connected to the upper chamber 101 of the first metering valve by way of line 111 and conduit 110 and to the low pressure line 14 connected to the discharge chamber 12 of the main valve 10 by way of line 111, conduit 110, line 133 provided with a fixed orifice 134, chamber 135 and line 136. A second chamber 139 formed by housing 116 and bellows 119 and 120 is connected to the low pressure line 14 by way of line 140, chamber 135 and line 136. The stem 121 is spring biased to resist downward movement by springs 141 and 142 and regulation of the spring loading on the stem is effected by adjustment of a nut 144 on which the spring 141 is seated. Leakage of pressure from upper chamber 126 along the stem 121 is effectively sealed by bellows 146.

The upper chamber 126 of the second metering valve communicates with the upper diaphragm chamber 34 of the main valve 10 by way of conduits 147 and 149 and with the low pressure line 14 by way of conduit 147, line 150 provided with a fixed orifice 151, chamber 135 and line 136. The lower chamber 127 is connected to the high pressure chamber 56 by means of ports 152 in a boss 154 for the spring 142.

In operation, the metering valve 99 between chambers 101 and 102 and valve 130 between chambers 126, 127 are normally maintained in closed positions by springs 100 and 141, 142, respectively. The metering valve 99 of the temperature actuated pilot 62, 64 is opened when the thermostat 67 senses a departure from the preselected temperature in the subject fluid. Opening of the metering valve 99 in turn actuates the second metering valve 130 through the medium of pressure in the chamber 132 exerted by the regnant fluid in high pressure chamber 56, by way of metering valve 99 conduit 110 and line 111. Upon opening of the second metering valve 130, pressure is transmitted through the valve from chamber 56 through ports 152 and lower chamber 127 to the upper diaphragm chamber 34 of the valve 10 by way of conduits 147 and 149.

Thus, for example, when the inlet chamber 11 is connected to a source of high pressure steam and the thermostat bulb 67 is immersed in water that is in heat exchange relation with steam from the discharge chamber 12, a lowering of the sensible temperature of the water, i. e., a demand for heat, is reflected by a contraction of the bellows 70 and consequently by an upward movement of the plunger 71. This in turn operates to rock the lever 77 in a counterclockwise direction and causes the stem 92 to be depressed, thus opening the first metering valve 99 against the action of spring 100. Upon counterclockwise rotation of the lever 77, the effective fulcrum for the lever moves toward the right end thereof, as seen in Figure 1, thus varying the ratio of the length of the lever arm actuated by the combined action of the plunger 71, the stem 79 and the spring 81 to the length of the lever arm acting on the stem 92. Because of the movement of the effective fulcrum point for the lever 77, the degree to which the metering valve 99 is opened is a variable (geometric) function of the difference between the sensible temperature of the water and the preselected temperature.

As the first metering valve 99 is opened, pressure is exerted in chamber 132 of the differential pressure pilot 66 to depress the stem 121 and open the second metering valve 130. The fixed orifice 134 in line 133 acts to permit the gradual build-up of pressure in chamber 132 as the metering valve 99 of the temperature actuated pilot is opened. The pressure in the chamber 132 is further compensated in part by a pressure in chamber 139 which is substantially equal to the pressure in the low pressure line 14 connected to the discharge chamber 12 of the main valve and in part by the springs 141 and 142. As the metering valve 130 opens, direct communication is provided between the high pressure side of the main valve 10 and the upper diaphragm chamber 34 of the valve 10 by way of line 57, high pressure chamber 56, valve 130, and conduits 147 and 149. The pressure thus transmitted to the upper diaphragm chamber 34 depresses the flexible diaphragm 32 and therefore also diaphragm pressure plate 31. The downward movement of the pressure plate is magnified and transmitted to the disk 22 and the valve stem 20, due to the ratio of moment arms on the lever 27, against the upward thrust of springs 24, 42 and 52 and the unbalanced differential pressure across main valve head 17 and interior valve head 51. The initial downward movement of valve stem 20 depresses stem section 50 and forces the interior valve head 51 to leave its seat 37 against the force of spring 52 and the unbalanced pressure against the valve head 51. This opening of the interior valve permits the accumulation of steam caused by leakage between skirt 39 and cylinder 40 in the chamber 44 to be vented or discharge to the low pressure line 14, thereby at least partially equalizing the pressure across the main valve head 17. Further downward movement of stem 20 results in contact between the shoulder 54 and the upper portion 47 of the main valve head 17 and unseating of the valve head from the valve seat 19 against the resistance of main spring 42 to permit direct flow of steam from high pressure chamber 11 to low pressure chamber 12 of the main valve 10 and then to a heat exchanger, not shown.

The flow of steam between the valve head 17 and valve seat 19 is accompanied by a local lowering of static pressure, due to the Venturi effect, and aspirates the steam from chamber 44 through the vent ports 49, thereby equalizing the static pressure on the valve head 17 despite variations in the flow rate of steam between the valve head 17 and valve seat 19. Since the pressure is always balanced across the main valve head 17 under any condition of flow through the valve, the force of the loading pressure against flexible diaphragm 32 is always strictly balanced against only the forces of springs 24 and 42, thereby eliminating the pulsation or fluttering of the valve head ordinarily encountered in heretofore proposed designs of pressure actuated main valves because of unbalanced pressure forces which constantly vary with changes in flow rate of steam. The orifice 151 in line 150 permits the gradual increase of pressure in upper diaphragm chamber 34 as the valve 130 of differential pressure pilot 66 is being opened by the loading pressure from the temperature actuated pilot 62, 64. The lever and pressure plate assembly 26—31 increases the sensitivity of the main valve to changes in pressure differential in upper and lower diaphragm chambers 34 and 36 and effectively reduces the amount of movement required for diaphragm 32.

As the pressure of the steam in the low pressure line 14 builds up, it is transmitted by way of line 136, chamber 135 and line 140 to the chamber 139 formed by the bellows 119 and 120. This pressure therefore tends to counteract the pressure in chamber 132 and to effect a throttling of the metering valve 130 and consequently also a throttling of the main valve 10 due to a decrease in pressure on the diaphragm 32. When the thermostat 67 is satisfied, i. e., when the temperature of the water has reached the preselected temperature, the fluid in the thermostat bulb 67, capillary tube 69 and bellows 70 will have expanded to an extent sufficient to depress the plunger 71 and raise the stem 92 to such an extent that the metering valve 99 will have been closed. This cuts off the pressure in the chamber 132 of the differential pressure pilot 66 and thereby operates to close metering valve 130 as well, with the result that the pressure on the diaphragm 32 of the main valve 10 will be reduced to a degree sufficient to close it.

In closing, the main valve head 17 contacts the main valve seat 19 in a completely balanced condition with respect to varying pressures caused by changes in steam flow. Further upward movement of main valve stem 20 allows the interior valve head 51 to be seated on the seat 37, closing the main valve 10 completely. Steam from the high pressure side 11 of the valve thereupon leaks between the skirt 39 and the cylinder 40 to accumulate in chamber 44 and creates a pressure differential across the main valve head 17. This differential in pressure assists main spring 42 and spring 24 in maintaining a positive closing of the main valve 10 under no flow conditions.

Because of the variable fulcrum for the lever 77, the opening of the metering valve 99 in the temperature actuated pilot 62, 64 and therefore also the opening of the metering valve 130 in the differential pressure pilot 66 is controlled by the difference between the preselected water temperature and the actual or sensible temperature thereof as sensed by thermostat 67. If the difference is great, the counterclockwise rotation of the lever 77 is correspondingly great and the downward movement of the stem 92, and therefore of the metering valve head 99, will be a multiple of the upward movement of the plunger 71 and bellows 70 for the reason that under such conditions the point of contact between the lever 77 and the shoe member 84 will be relatively close to the end of the lever actuated by the plunger 71. As the lever 77 becomes more nearly level due to the approach of the sensible temperature to the preselected temperature, the point of contact moves to the left, as seen in Figure 1, with the consequence that the vertical movement of the stem 92 may become equal to or even smaller than the vertical movement of the plunger 71. It is apparent, therefore, that the degree to which the metering valve 99 is opened due to actuation by the thermostat is a geometric rather than a linear function of the difference between the sensible temperature sensed by the thermostat and the preselected temperature for which the mechanism has been set by adjustment of the vertical and horizontal position of the shoe member 84, as well as by the curvature and length of the bearing surface 86. The fixed orifices 151 and 134 are designed to meter properly the flow of high pressure steam which flows through the differential pressure actuated pilot 66 and temperature actuated pilot 62, 64, respectively, in order to build up gradually the operating pressure to main valve diaphragm 32 and the loading pressure to the differential bellows chamber 132 of the differential pressure actuated pilot 66. Conversely, when the respective pilots operate to reduce the pressures in conduits 147, 149, 150 and 110, 111, the fixed orifices 151 and 134 act as vents to permit the residual pressures to be vented from the respective upper metering valve chambers 126 and 101.

The pressure equalizing bellows 112 for the metering valve 99 reduces the force required by spring 81 to elevate plunger 71, move lever 77 counterclockwise, and open the temperature actuated metering valve 99 when high pressure steam enters the inlet chamber 11 of the main valve 10. This partial balancing of the force of spring 81 not only increases the sensitivity of the metering valve 99 to small changes in temperature sensed by the thermostat 67 but permits the bellows 70 to expand and thus avoids rupture of the thermal system in the event the temperature sensed by the thermostat should for some reason exceed appreciably the preselected temperature.

A typical embodiment of the invention in which the differential pressure pilot 66 and pressure equalizing bellows 112 are omitted is illustrated in Figure 6 of the drawing. In this instance, the upper chamber 101 of the temperature actuated pilot 62, 64 is connected directly to the upper diaphragm chamber 34 of the valve 10 by way of conduit 110, line 156 and conduit 149 and to the low pressure line 14 by way of conduit 110, line 133, fixed orifice 134, chamber 135 and line 136.

The operation of this embodiment of the invention is substantially similar, in so far as the temperature actuated pilot is concerned, to the operation described with reference to Figure 1. The only important difference is that the pressure in the upper chamber 101 of the metering valve is transmitted directly to the upper diaphragm chamber 34 of the valve 10 and that the amount of pressure so transmitted to the upper diaphragm chamber is metered and controlled by the relation between the variable opening of the metering valve 99 and the fixed orifice 134 in the line 133 which communicates with the low pressure line 14. When low pressure steam enters the main valve 10, and the degree of control of the outlet temperature of the steam is not extremely critical, the modulation of the operating pressure transmitted to the upper diaphragm chamber 34 of the pressure actuated main valve 10 can be satisfactorily accomplished by the variable metering of the temperature actuated pilot 62, 64, with the varying fulcrum lever action and the relation between the fixed orifice 134 and the variable opening of the valve 99.

Numerous modifications and applications will immediately become apparent to those skilled in the art on reading this description. It is to be understood that all such modifications and applications are intended to be included within the scope of the invention as defined in the accompanying claims.

I claim:

1. A pressure actuated non-fluttering valve that is statistically and dynamically balanced under all conditions of flow for regulating the flow of a fluid which comprises an inlet chamber; a discharge chamber; a primary valve seat between said inlet and discharge chambers; a flexible diaphragm; a valve stem responsive to movement of the flexible diaphragm; a primary valve head spring-biased to seat on the primary valve seat and having an extension engageable with the stem, said extension projecting into said discharge chamber and being of smaller diameter than said valve seat to enable fluid to flow through said seat and around said extension into said discharge chamber, a concavely curved surface at the junction of said extension with said valve head out of the direct path of flow of fluid through said seat, thereby enabling flow of fluid through said seat to create a low pressure zone adjacent to said curved surface, a secondary valve seat, and a vent port in said extension and extending radially through said curved surface for venting fluid from the inlet chamber past the secondary valve seat into the discharge chamber and thereby maintaining static and dynamic pressure balance across the primary valve head and preventing flutter thereof; and a secondary valve head carried on the stem within the primary valve head and seatable on the secondary valve seat; the secondary valve head being unseatable from the secondary valve seat by a small initial increment of movement of the flexible diaphragm transmitted to the valve stem for venting fluid from the inlet chamber to the discharge chamber through the vent port and the primary valve head being unseatable from the primary valve seat by a further, and more substantial movement of the flexible diaphragm and engagement of the valve head extension with the stem.

2. The pressure actuated valve defined in claim 1 comprising a lever having one end portion pivotally mounted adjacent to said diaphragm and its opposite end portion engaging said valve stem for moving it endwise and means on said diaphragm engaging said lever between its end portions to magnify the movement of the flexible diaphragm transmitted to the valve stem.

3. A pressure actuated non-fluttering valve that is statically and dynamically balanced under all conditions of flow for regulating the flow of a fluid which comprises an inlet chamber; a discharge chamber; a primary valve seat between said inlet and discharge chambers; a valve stem, a primary valve head spring-biased to seat on the primary valve seat and having an extension engageable with the stem and a passage through said extension and valve head connecting said inlet and discharge chambers and receiving a portion of said valve stem, said passage being of greater diameter than said portion of said valve stem, said extension being of smaller diameter than said primary valve seat and having a concavely curved surface at the junction of said valve head and extension out of the path of direct flow of fluid between said seat and head, thereby enabling flow of fluid to create a zone of decreased pressure at the discharge side of said valve head adjacent to said curved surface, a secondary valve seat on said valve head at the inlet chamber of said passage, and a vent port extending substantially radially through said extension from its concavely curved surface to said passage for venting fluid from the inlet chamber past the secondary valve seat into the zone of reduced pressure and said discharge chamber and thereby maintaining static and dynamic pressure balance across the primary valve head and preventing fluttering thereof; and a secondary valve head carried on the stem within the primary valve head and seatable on the secondary valve seat; the secondary valve head being unseatable from the secondary valve seat by an initial movement of the valve stem for venting fluid from the inlet chamber to the discharge chamber through the passage and the vent port and the primary valve head being unseatable from the primary valve seat by a further movement of the valve stem and engagement of the valve head extension with the stem.

References Cited in the file of this patent

UNITED STATES PATENTS

| | | |
|---|---|---|
| 303,712 | Demarest | Aug. 19, 1884 |
| 824,681 | Ashley | June 26, 1906 |
| 851,555 | Norton | Apr. 23, 1907 |
| 895,343 | Collin | Aug. 4, 1908 |
| 1,071,777 | Murphy | Sept. 2, 1913 |
| 1,247,216 | Brown | Nov. 20, 1917 |
| 2,035,166 | Kimball | Mar. 24, 1936 |
| 2,111,230 | Toussaint | Mar. 15, 1938 |
| 2,243,957 | Heinle | June 3, 1941 |
| 2,388,457 | Ziegler | Nov. 6, 1945 |
| 2,401,144 | Dube | May 28, 1946 |
| 2,536,184 | Johnson | Jan. 2, 1951 |
| 2,589,251 | Heinz | Mar. 18, 1952 |
| 2,679,829 | Gorrie | June 1, 1954 |

FOREIGN PATENTS

| | | |
|---|---|---|
| 251,392 | Great Britain | May 6, 1926 |
| 951,499 | France | Apr. 18, 1949 |

OTHER REFERENCES

McRae: Pages 399, 400 and 436 of "Instruments" magazine for July 1943. (Copy in Scientific Library.)